US005133123A

United States Patent [19]

Rigg

[11] Patent Number: 5,133,123

[45] Date of Patent: Jul. 28, 1992

[54] SECURITY GRATINGS AND METHODS OF MAKING BARS THEREFOR

[75] Inventor: Dewey D. Rigg, Edgewood, Ky.

[73] Assignee: Stewart-Decatur Security Systems, Inc., Erlangeb, Ky.

[21] Appl. No.: 584,733

[22] Filed: Sep. 19, 1990

Related U.S. Application Data

[63] Continuation of Ser. No. 273,482, Nov. 18, 1988, abandoned.

[51] Int. Cl.[5] .......... L04H 3/08; L04C 2/42; B23P 11/00

[52] U.S. Cl. .......... 29/897.31; 29/505; 29/509; 29/897.3; 52/106; 52/660; 52/664; 52/666; 52/669; 49/50; 109/49.5; 109/79; 109/85

[58] Field of Search .......... 52/106, 660, 664–669, 52/727, 207; 29/505, 509, 897.3, 897.31, 897.33; 72/325; 49/50; 109/49.5, 79, 85

[56] References Cited

U.S. PATENT DOCUMENTS

| | | | |
|---|---|---|---|
| 587,631 | 8/1897 | York | 52/669 X |
| 856,130 | 6/1907 | Canda | 52/106 X |
| 856,131 | 6/1907 | Canda | 52/667 |
| 1,610,544 | 12/1926 | Youngblood | 52/669 |
| 1,989,149 | 1/1935 | Pennock | 52/648 |
| 2,064,334 | 12/1936 | Bayley | 52/207 |
| 2,064,335 | 12/1936 | Bayley | 52/106 |
| 2,312,015 | 2/1943 | Weber | 52/666 X |
| 2,404,570 | 6/1946 | Elliot | 52/669 X |
| 2,898,988 | 8/1959 | Zoll | 52/669 X |
| 3,369,337 | 2/1968 | Butler | 52/669 X |
| 3,383,822 | 5/1968 | Viehmann | 52/667 |
| 3,455,005 | 7/1969 | Mentis | 52/667 X |
| 4,090,709 | 5/1978 | Fuji | 29/505 X |
| 4,438,555 | 3/1984 | Tsumuki et al. | 29/505 |

FOREIGN PATENT DOCUMENTS

| | | | |
|---|---|---|---|
| 658816 | 4/1938 | Fed. Rep. of Germany | 72/325 |
| 1241201 | 5/1967 | Fed. Rep. of Germany | 29/509 |
| 30097 | 6/1933 | Netherlands | 52/668 |

*Primary Examiner*—David A. Scherbel
*Assistant Examiner*—Joanne C. Downs
*Attorney, Agent, or Firm*—Kinney & Schenk

[57] ABSTRACT

A security grating of the type comprising an openwork grid is described. It comprises horizontal bars and vertical rods. The rods pass through openings in the bars. At the each intersection between a bar and rod, a set of tabs locks the bars against movement relative to the rod. A method is described for making these rods from common, rolled round rod stock. A four element punch is employed to displace, or swage, the rod material outwardly to form the tabs in an economical manner.

2 Claims, 2 Drawing Sheets

SECURITY GRATINGS AND METHODS OF MAKING BARS THEREFOR

This is a continuation of application Ser. No. 273,482 filed Nov. 18, 1989 now abandoned.

The present invention relates to improvements in security gratings and more particularly to improvements in rods employed in forming openwork grids and further to improved methods of making such rods.

Security gratings may be employed for many purposes. Their most familiar use is in prisons and similar institutions where they are employed in openings, to define various portions of a detention cell, or are otherwise to employed to prevent a prisoner from escaping from confinement, as well as to prevent others from coming to his aid in attempting escape.

A typical grating, of the type to which the present invention relates, comprises a rigid frame, usually of rectangular outline. A series of spaced, parallel rods spans one pair of frame members and a series of spaced, parallel bars spans the other pair of frame members. The rods extend through openings in the bars in forming this openwork grid structure.

It has long been recognized that a possibility exists for the bars to be bent to a position where there would be a greater spacing between an adjacent pair of bars. This could then permit a pair of rods to be bent to a greater spacing, whereby an opening would be created, which would be of sufficient expanse to permit a person, or contraband, to slip through the grating, thus gaining unauthorized access into or egress from a secured area.

It has, also, long been recognized that some means is required to prevent relative movement between the bars and the rods in order to prevent any substantial deflection of the bars, or the rods, which would defeat the security purposes of the grating. While welding the rod and bar intersections is an obvious means for accomplishing this end, various limitations in this approach have led to an industry wide acceptance of a mechanical means for obtaining the interlocking function.

More specifically, it has become an industry standard to employ rods which have oppositely projecting, lengthwise splines. The openings in the bars have outlines corresponding to the splined cross sections of the rods. At each point along the length of a rod, where it is to intersect a bar, the spline is removed. The rod is thus provided with a circular cross section for a length approximating the thickness of the bar. The grating frame can also have openings corresponding to the splined cross section of the rods.

Thus the rods may be inserted through one frame member, through the cross bars and into the opposite frame member. With the bars properly spaced, and aligned with the circular cross sections of the rods, the rods may then be rotated so that the bars are captured between the interrupted portions of the splines. The splines would also be removed from ends of the rods to permit this rotation relative to the frame members.

The mechanical lock thus provided to prevent relative movement between the rods and bars has been found highly effective and, as indicated, is accepted as an industry security standard.

The drawback of the described construction is the expense of the splined rods. As a continuous, splined rod, their fabrication is a relatively straight forward rolling mill process. Nonetheless, it is a more expensive product, compared to common round rod, or bar stock. Further, the demand for these splined rods is minuscule compared to round rolled rod or bar stock. With such limited demand there are limited sources of supply, all of which contribute to the relatively high expense of these specialized rods. In fact, at the present time there is only one known domestic source for such splined rods and only one foreign source. With this limited demand and lack of competition, the price of the rods becomes significantly higher than plain round stock and a factor of some consequence in the manufacture of security gratings.

Accordingly, the object of the present invention is to reduce the cost of security gratings without compromising the their security functions.

A further object of the present invention is to provide more economical rods for incorporation in security gratings in the same fashion as splined rods.

Another object of the present invention is to attain the foregoing ends through a method that employs standard, round bar stock.

The foregoing ends may be attained by a security grating in the form of an openwork grid, formed of parallel, spaced bars and parallel spaced rods, of circular cross section, disposed at right angles thereto. The bars have openings through which the rods pass.

The rods, at each intersection with a bar, have a set of locking tabs for preventing movement of the bar relative to the rod. The locking tabs are formed by metal displaced from the circular cross section of the rod. The tabs project laterally from the rod and are of limited axial length. Each set of tabs comprises first and second pairs spaced apart a distance approximating the thickness of a bar. These tabs project into interfering relation with opposite sides of the bar to prevent its movement relative to the rod.

The openings in the bars have an outline approximating the cross section of the rod through the tabs, permitting the rods to pass therethrough and then to be rotated to a locking position during assembly.

Preferably each set of tabs comprises a first and second pair of tabs which, respectively, include the tabs which project into interfering relation with opposite sides of the bar. The tabs of each pair are radially aligned, and project in diametrically opposite directions. Further it is preferred that all pairs of tabs on a rod be axially aligned.

In accordance with the method aspects of the invention, the rods are economical round bar stock. The tabs are swaged by forcing a punch into the rod to form the tabs. Preferably a four element punch is employed to simultaneously form the two pair of tabs which form a set of tabs for locking a bar relative to the rod.

The above and other related objects and features of the invention will be apparent from a reading of the following description of the disclosure found in the accompanying drawings and the novelty thereof pointed out in the appended claims.

Figure 1:
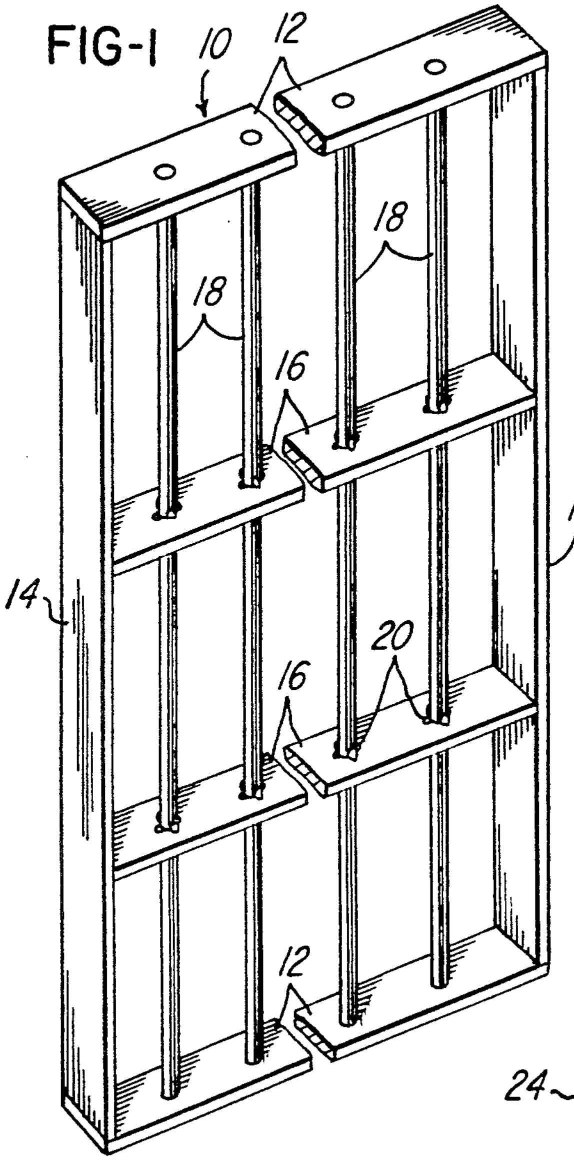
FIG. 1 is a perspective view of a security grating embodying the present invention.

FIG. 1 illustrates a security grating, indicated generally by reference character 10, embodying the present invention. The grating 10 comprises a rectangular frame having top and bottom members 12 and side members 14. An openwork grid is formed within this frame by horizontal bars 16 and vertical rods 18.

The horizontal bars 16 may be, and preferably are, secured, as by welding, to the side frame members 14. The vertical rods 18 extend through openings 20 in the bars 16 and span the top and bottom frame members 12. Mechanical means are provided for preventing movement of the bars 16 relative to the rods 18. As above explained, these locking means prevent forced deflection of the bars which in turn could permit forced deflection of the rods and enlargement of the grid opening.

Figure 2:
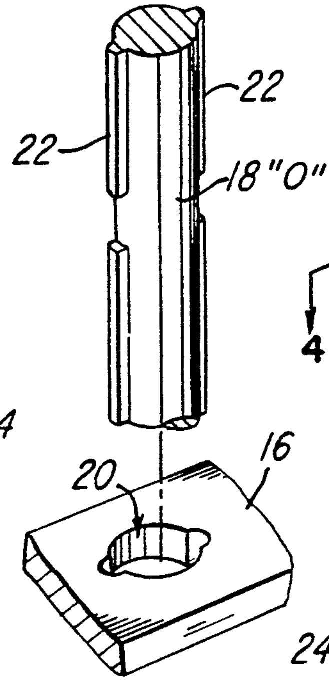
FIG. 2 is a perspective view of a security grating rod as used pursuant to prior art teachings.
Figure 3:
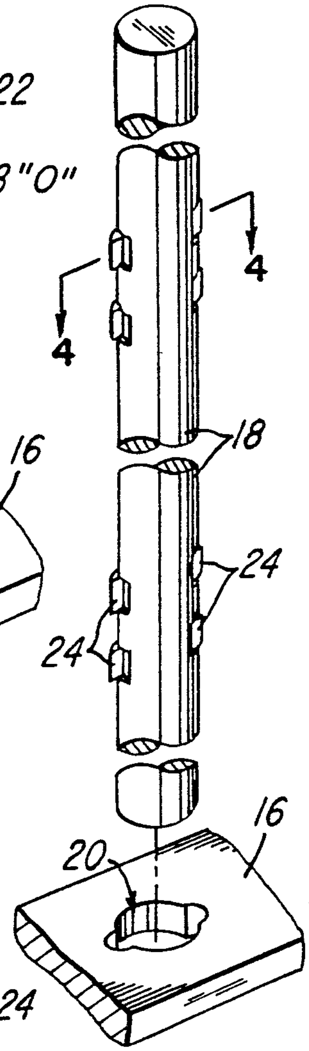
FIG. 3 is a perspective view of a security grating rod formed in accordance with the present invention and illustrating its incorporation in a grating.
Figure 4:
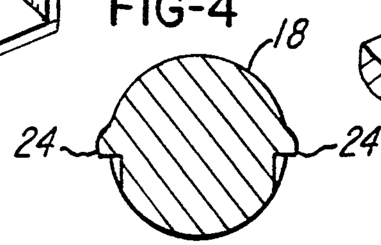
FIG. 4 is a section, on an enlarged scale, taken on line 4—4 in FIG. 3.
Figure 5:
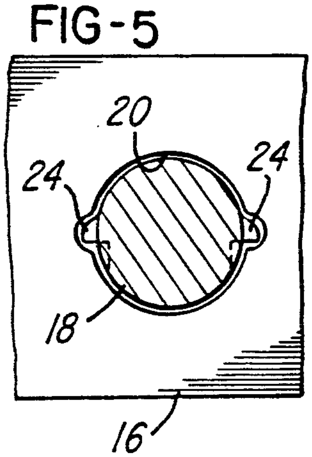
FIG. 5 is a cross section through the rod seen in FIG. 3, on an enlarged scale, and illustrating its assembly with a grating bar.
Figure 6:
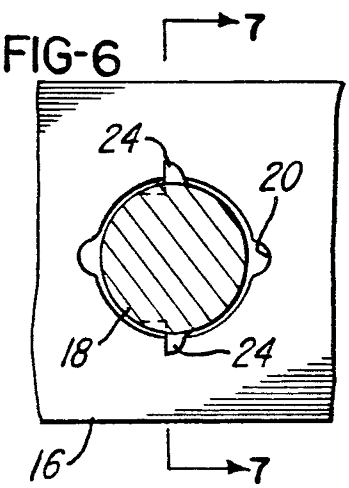
FIG. 6 is a section, similar to that of FIG. 5, illustrating a locked relationship between the bar and rod.
Figure 7:
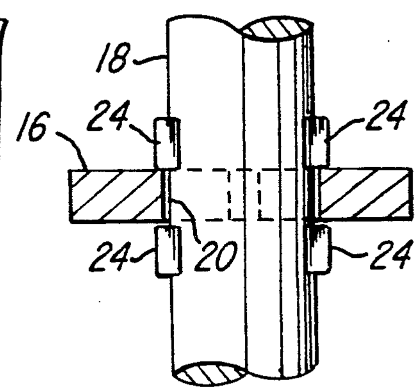
FIG. 7 is a section taken on line 7—7 in FIG. 6.

The locking means of prior art are illustrated in FIG. 2 and will first be described. The frame members, cross bars 16 and openings 20 may be identical with the corresponding components referenced in FIG. 1. The illustrated vertical rod, of the prior art, is designated by reference character 18 "0".

Rod 18 "0" is nominally of circular cross section and has integral, outwardly projecting splines 22, extending along its length. Conventionally, these splines are formed by a rolling process at the steel mill where rod stock is formed in indefinite lengths. The rod stock is cut to the necessary length to span the frame members of a given grating. The spline portions are then removed, as by a punching operation, to create rod portions of circular cross section of a length which approximates, or is slightly greater than, the thickness of the bar 16. Lengths of circular cross section along the length of the rod 18 "0" for each of the bars which is to be intersected by the rod 18 "0". The splines are also removed at the end portions of the rods 18 "0" for reasons that further appear.

The bar openings 20 have an outline which approximates and is slightly larger than the splined cross section of the rod 18 "0". The rods 18 "0" are inserted through the openings 20 of the several bars 16. The bars are respectively aligned with the circular cross section portions of the rods (where the splines have been removed). Each of the rods is then rotated on its axis so that the ends of the splines embrace the opposite surfaces of the bars 16. The ends of the rods 18 "0" are then welded to one or both of the upper and lower frame members to maintain them in positions in which the bars 16 are captured between the splines and restrained from movement relative to the rods 18 "0".

Reverting now to FIGS. 2-7, it will be seen that the rods 18, of the present invention, are basically of circular cross section. Spaced along the length of each rod 18 are pairs of diametrically, oppositely projecting, integral tabs 24. The pairs of tabs 24 are provided in sets of two pairs which are spaced apart to define a length of the circular cross section of the rod which approximates, or is slightly greater than, the thickness of the bars 16. The tabs 24 are of limited axial length, sufficient to provide the necessary strength to prevent forced deflection of the bar.

The cross section of the rod 18, taken through the tabs 24, preferably, falls within the outline of the opening 20 which received the splined rod 18 "0". Thus the same bars 16, or the same tooling therefor, may be employed to fabricate bars 16, in assembling security grates incorporating the improved rods 18.

Assembly of a security grating follows preexisting procedures. The rods 18, with the tabs 24 aligned with the elongated portions of the respective openings 20, are inserted through the bars 16. The bars 16 are aligned with the circular rod cross sections between the respective sets of tab pairs. The rods are rotated on their axes to the relative position of FIG. 7. The tabs 24 respectively overly and underlie the bar, capturing it therebetween and preventing movement of the bar 16 relative to the rod 18.

The bars 16 may be welded in place on the frame side members 14 and the rods 18 inserted through the top or bottom members 12 in the assembly of a security grating 10.

Figure 8:
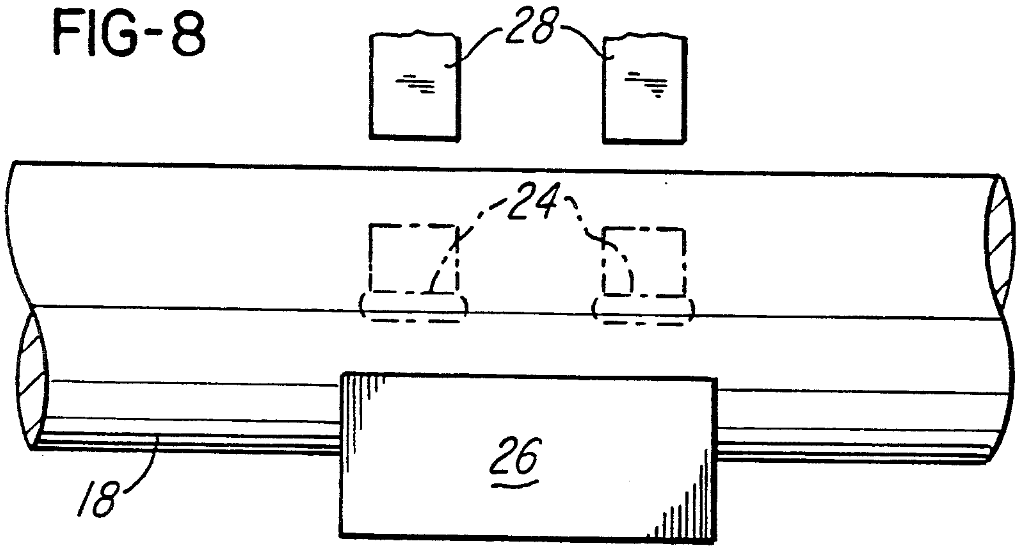
FIG. 8 is a fragmentary view illustrating the method aspects of the present invention.
Figure 9:
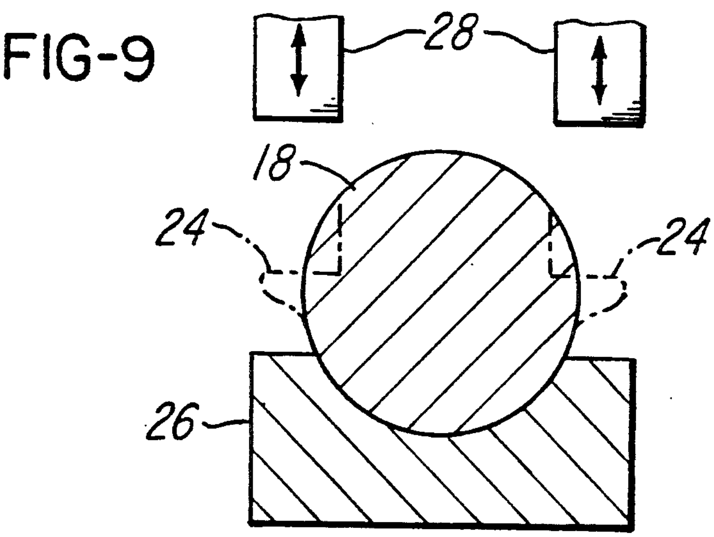
FIG. 9 is a section of taken on line 9—9 in FIG. 8.

FIGS. 8 and 9 illustrate the method employed in making the rods 18. The rods are formed from round stock as is commonly produced by rolling techniques. This stock is in widespread use and available from numerous commercial sources at a cost significantly less than the splined bar stock of the prior art security rods.

The tabs 24 are formed by a swaging process. The process itself, and its techniques, are well known. Basically a rod 18 is placed on a fixed anvil 26, or other wise supported for the swaging operation. Advantageously, the four tabs of a set of two pairs are, preferably. formed simultaneously by a punch comprising four elements 28, which are appropriately spaced to produce the configuration of FIG. 3. Appropriate means are provided to force the elements 28 into the rod to displace the metal of the rod into the desired tab form.

The rod material may be any of the metals, normally a steel, now used in grating bars of conventional design. Likewise the bars and frame members can be any metal now in use for such purposes.

Reference is made herein to spacial relationships such as top and bottom for ease of description and not by way of limitation. It will also be noted that a "set" of tabs could comprise a single tab above and a single tab below the bar. These and other variations of the described embodiment will occur to those skilled in the art within the spirit and scope of the invention as defined in the claims.

Having thus described the invention, what is claimed as novel and desired to be secured by Letters Patent of the United States is:

1. In a method of making security grating, adapted for use in prisons and like structures, comprising
   - a rectangular frame formed by spaced top and bottom members and a pair of spaced side members, and
   - an openwork grid formed by
   - parallel, spaced, integral bars extending between and secured to the side members of the frame and
   - parallel, spaced, integral rods extending between and secured to the top and bottom frame members and having a nominal circular cross section and disposed at right angles to the bars,
   - said bars having openings through which said rods pass during assembly of the grid, each of said openings being of circular outline with diametrically opposed recesses extending outwardly therefrom, the improvement comprising the steps of swaging, from the metal of each rod, a set of locking tabs at each intended intersection with a bar, characterized in that said locking tabs are displaced outwardly from the circular cross section of the rods and said tabs projecting laterally from the rods and having a limited axial length, each set of displaced tabs comprising first and second tabs spaced apart a distance approximating the thickness of a bar, each set of locking tabs comprising a first pair of locking tabs which includes said first tab, and a second pair of locking tabs which includes said second locking tab, the tabs of each pair being radially aligned and projecting in diametrically opposite directions from the rod, and the pairs of tabs on each rod being axially aligned, and further characterized in that the cross section of each rod, taken through a pair of tabs, approximates the outline of the openings in said bars, and the steps of inserting the rods through the bar openings to bring each bar between the pair of tabs comprising a set of tabs at an intended intersection of the bars with the rods, rotating each rod relative to the bars to displace the tabs out of registration with the bar opening recesses and into an interfering relation, thereby preventing relative movement, in a lengthwise direction, therebetween, and securing the rods against rotation to maintain said interfering relation.

2. A method of making rods for use in the fabrication of security gratings adapted for use in prisons and like structures comprising an openwork grid formed by a plurality of parallel, spaced, integral bars and a plurality of parallel, spaced, integral rods disposed at right angles to the bars, said method comprising the steps of placing a length of metal of circular cross section on an anvil, forming integral tabs in the length of metal by employing a four element punch, the elements of said punch being axially spaced, relative to the length of the rod, a distance approximating the thickness of the bars, and the ends of the elements lying in a common plane, and the tab forming steps include forcing the four element punch into the rod to form a set of locking tabs comprising a first pair of tabs and a second pair of tabs, with the tabs of each pair being radially aligned and projecting in diametrically opposite directions from the rod, and further with the pairs of tabs on the rod axially aligned, and forcing said four element punch into said rod to form further sets of tab pairs at spaced intervals along the length of the rod.

* * * * *